INVENTOR.
Carl W. Proffer
BY
Charles R. White
ATTORNEY

United States Patent Office
3,437,158
Patented Apr. 8, 1969

3,437,158
ADJUSTING TOOL
Carl W. Proffer, Cleveland, Ohio, assignor to General Motors Corporation, Detroit, Mich., a corporation of Delaware
Filed Feb. 28, 1967, Ser. No. 619,321
Int. Cl. E21c *1/10, 5/08;* B23q *5/06*
U.S. Cl. 173—163                    10 Claims

ABSTRACT OF THE DISCLOSURE

A power tool having reversible first and second input motors and an output driven by each motor and having motor controls selectively operative to effect rotation of the outputs in either forward or reverse direction, and further having a control reel which automatically couples to a driving shaft for one of the outputs by a one-way locking device; the control reel unwinds a cable of predetermined length from a recoil reel to limit the number of rotations the latter output makes in one direction. After the controls are released, the recoil reel automatically rewinds the cable from the control reel to set the second output for subsequent repeat operation.

---

This invention relates to tools and more particularly to a power tool having a reversible output driven by an input and having a mechanism for limiting the number of rotations the output makes in one direction from a starting position and for automatically returning the output to the starting position when not being driven by the input subsequent to removal of the tool from a threaded member.

Prior art tools have included a plurality of inputs for driving coaxial outputs in forward and reverse direction. These tools are adaptable for adjusting set screws and lock nuts in a sequence of operations. Also, counting devices have been utilized to count the number of revolutions of at least one of the outputs permitting a tool operator to precisely turn the set screw to a given number of turns. However, such tools do not limit the number of revolutions of the set screw as would be advantageous in assembly-line production where identical settings are desired for uniformity such as in the adjustment of automatic transmission brake bands.

In adjusting automatic transmission brake bands, such as that shown and described in U.S. Patent 3,353,637 issued Nov. 21, 1967, improved operation of the transmission is obtained by having the band spaced a set distance from the drum. By setting this distance the band will have a predetermined travel before the reaction drum is held from rotation to condition the gear unit of the transmission for power transmission. To improve standardization of quantity-produced automatic transmissions, the adjusting screw for anchoring the brake band has heretofore been turned to ground the band on the drum and then backed off a predetermined number of turns to accurately adjust the band. A lock nut is then utilized to hold the adjusting screw in its adjusted position. Prior to the present invention the backing off of the adjusting screw required the close attention of the operator in performing this comparatively tedious and time-consuming operation.

With the present invention a power tool having a plurality of coaxial forward and reverse driven outputs is utilized to make such an adjustment. A first motor mechanism is utilized to drive one of the outputs for adjusting the lock nut on the adjusting screw while a second motor mechanism is utilized for adjusting the set screw. This invention further includes construction for limiting the number of rotations of the set screw in one direction so that the brake band will be moved off of a reaction drum a set distance. After the tool is removed from the set screw and lock nut, this mechanism automatically conditions the tool for a subsequent operation.

It is an object of this invention to provide an adjusting tool having a rotatable forward and reverse output which is feely driven in one direction to initially set a threaded member and which is subsequently driven in an opposite direction a predetermined number of turns to back the threaded member a predetermined distance from the set position.

Another object of this invention is to provide a power tool having an output which can be driven an infinite number of rotations in a first direction and a limited number of rotations in an opposite direction to precisely adjust a threaded member and including automatic means for returning the rotation limiting mechanism to a start condition to condition the tool for another cycle of operation after the threaded member has been adjusted.

Another object of this invention is to provide an improved automatic transmission brake band adjusting tool including a plurality of control members operable to effect rotation of the tool output in a forward or reverse direction.

Another object of this invention is to provide a tool having a plurality of forward and reverse rotatable outputs including a limiting mechanism to limit the number of turns one of the outputs can make from a start position and further including selectively operable controls for effecting rotation of the outputs in a selected direction.

These and other objects of the invention will become more apparent from the following description of a preferred embodiment of the invention illustrated in the drawings in which.

Figure 1:
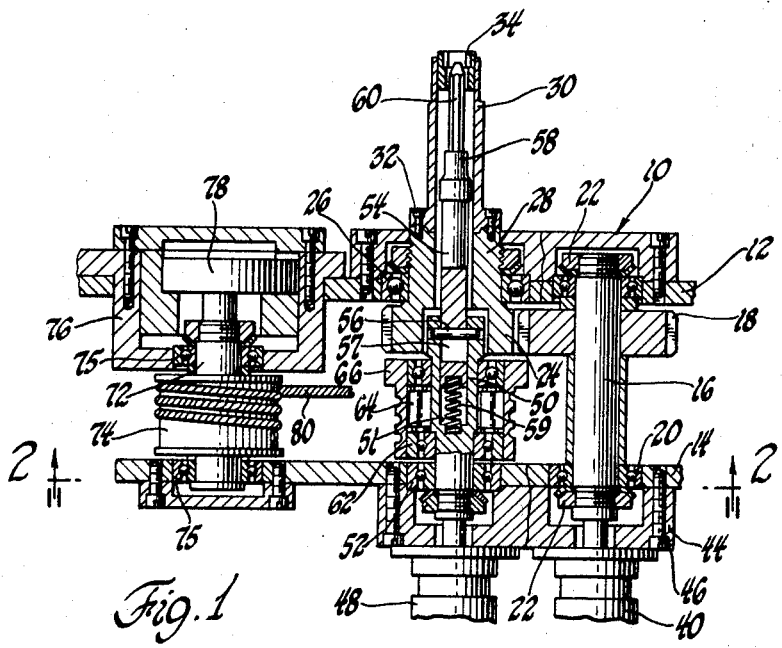
FIGURE 1 is a view partly in section of a preferred embodiment of the invention.

The adjusting tool of this invention includes a housing 10 having forward plate 12 and rear plate 14 spaced and connected by side wall construction. A drive shaft 16 carrying a drive gear 18 is supported for rotation in the housing by bearings 20 and is retained in the housing by lock nuts 22. The teeth of the drive gear 18 mesh with the teeth of a driven gear 24 which is rotatably mounted in the housing by bearing 26. The driven gear 24 has a cylindrical portion 28 extending from one side to which a socket drive tube 30 is attached by screws 32. The outer end of the drive tube is formed to receive and drive a socket 34 which has internal dimensions for fitting on and turning a nut such as the polygonally-shaped lock nut 36 threaded on the screw 38 in turn threaded on housing 39. The lock nut and screw may be the adjustment device for an automatic transmission brake band such as that illustrated in the above-identified patent application.

The drive shaft 16 is driven by a reversible air motor 40 which is secured by screws 42 to the rear bearing hub 44 fastened to the rear plate 14 by bolts 46. A second reversible air motor 48 secured in a similar manner to the hub 44 is connected to a drive shaft 50 rotatably mounted in the housing by a bearing 52. The drive shaft 50 extends from the motor 48 and is piloted into the gear 24 as shown in FIGURE 1 so that it can rotate relative to that gear. Shaft 50 has a bore 51 to slidably receive the end of drive extension 54. Dowell 56 secured to shaft 50 extends through a narrow slot 57 formed in extension 54 to permit shaft 50 to rotate extension 54 and permit relative longitudinal movement between these two parts. Spring 59 between the end of shaft 50 and the bottom of bore 51 normally biases the extension to the FIGURE 1 position. A snap-on socket 58, secured to the end of the extension by a shank and socket connection, receives the end of a screwdriver bit 60 coaxial with a socket drive tube 30. As the nut 36 is tightened by socket 34, the bit 60 and extension 54 retract compressing spring 59 so that the socket can fully advance nut 36 while the bit maintains engagement with the slot in screw 38.

Figure 2:
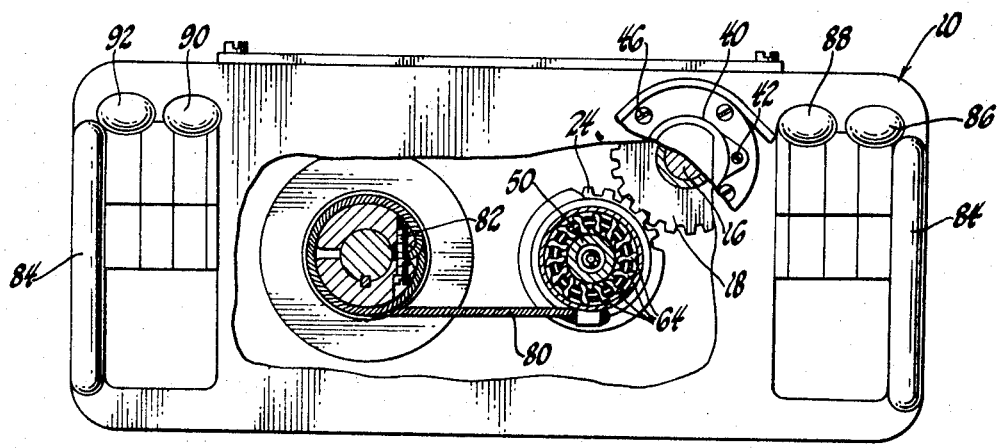
FIGURE 2 is a view taken along the line 2—2 of FIGURE 1.
Figure 3:
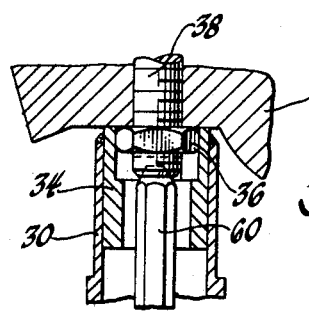
FIGURE 3 is an enlarged view of a portion of FIGURE 1 showing the tool applied to an adjusting screw and lock nut.

Mounted on shaft 50 by spaced bearings 62 and a sprag unit 64 between the rear plate and gear 24 is a take-up reel 66. The sprag unit permits relation rotation of the shaft 50 and the take-up reel when the shaft rotates clockwise in FIGURE 2 but automatically operates to securely connect this shaft and the take-up reel when shaft 50 rotates in an opposite direction.

Laterally spaced from the shaft 50 is a spindle 72 on which a wind-up reel 74 is secured. The spindle is rotatably mounted by bearing units 75 in the rear plate 14 and a case 76 secured by suitable fastener means to the forward plate 12. One end of the spindle extends into case 76 and is attached to the inner end of a coil spring 78. The other end of the coil spring is grounded by suitable securing means to the case. The wind-up reel carried a stranded cable 80 which has one end fastened thereto by bolt 82 and the other end fastened to the take-up reel 66. This cable is of a predetermined length and will permit the take-up reel and the shaft 50 when coupled together to rotate only a limited number of revolutions as will be described.

Figure 4:
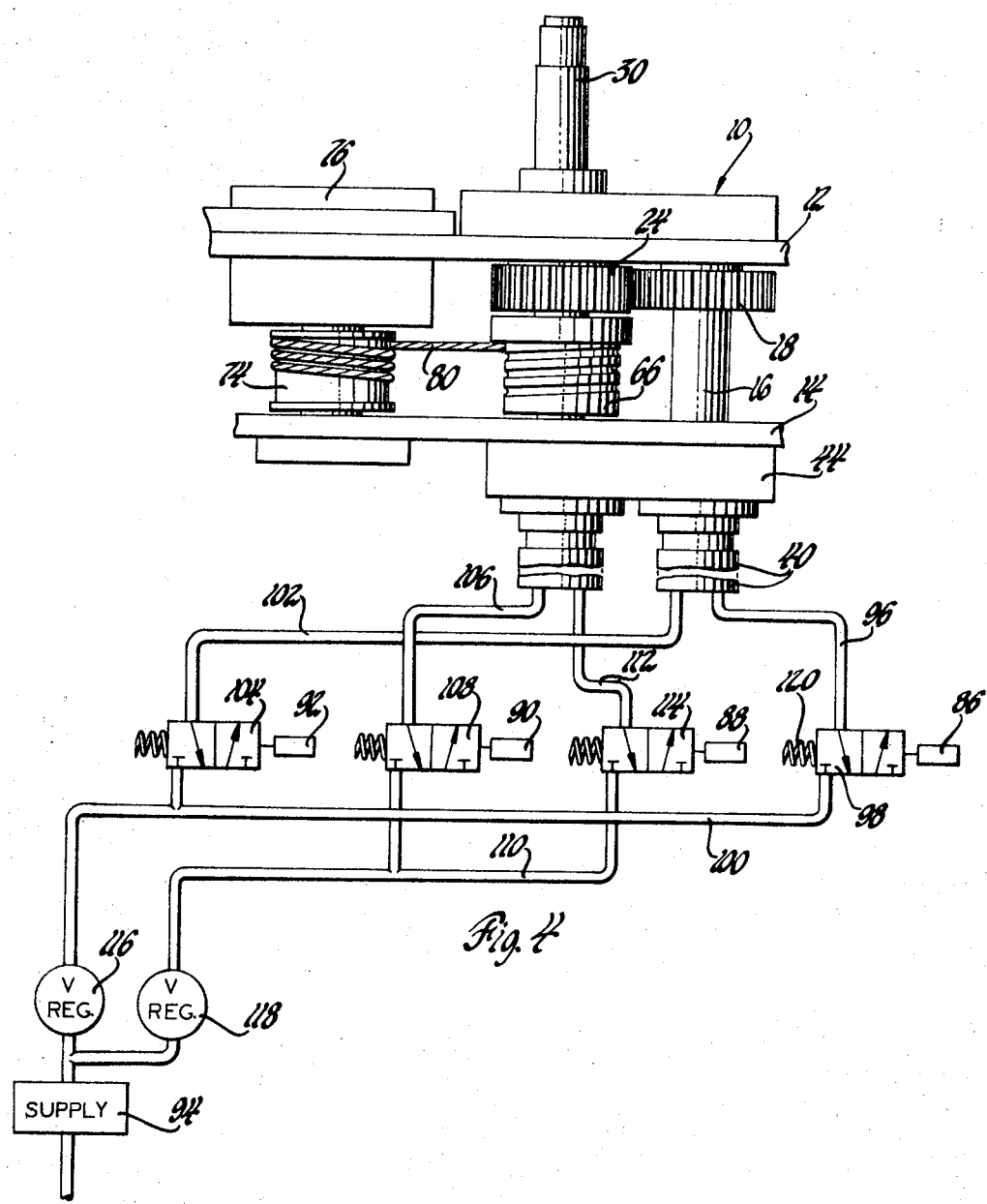
FIGURE 4 is a diagrammatical view of the adjusting tool and controls therefor.

The tool is provided with gripping handles 84 which are fastened to the rear plate to facilitate operator manipulation of the tool. Also, push buttons 86, 88, 90 and 92, conveniently located adjacent to the handles, are provided to select and control the direction of rotation of the air motors 40 and 48 and the output members formed by socket 34 and screwdriver bit 60. The controls for the air motors are shown diagrammatically in FIGURE 4.

The forward inlet of air motor 40 is connected to the operating air supply 94 by passage 96, valve 98 and passage 100. The reverse inlet of this air motor is connected to the supply by passage 102, valve 104 and the passage 100. The forward inlet of air motor 48 is connected to the supply 94 by passage 106, valve 108, passage 110; and the reverse inlet of this motor is connected by passage 112, valve 114 and the passage 110. As shown, pressure regulating valves 116 and 118 are connected in the passages 100 and 110 for regulating the pressure supplied to the motors. Each of the valves is the same in construction having an inlet port, an outlet port and an exhaust port. A helical compression spring 120 urges the valve to its normally closed position connecting the outlet and exhaust ports. The push button is capable of being actuated to shift its respective valve against the bias of the spring to its open position connecting the inlet and exhaust ports.

In operation the operator can grasp the spaced handles and position the adjusting tool so that the socket 34 of the drive tube engages the lock nut 36 and the screwdriver bit 60 engages the slot in the head of adjusting screw 38. Air valve button 86 is momentarily depressed and the motor 40 will rotate clockwise as in viewing FIGURE 2 to turn the gear 24 and the connected socket 34 counterclockwise. This button is depressed only long enough to allow the motor to break the nut loose. Air valve button 90 is depressed so that the motor 48 operates to drive the screwdriver bit clockwise which applies a torque, determined by the regulated pressure of the air supply, to the adjusting screw driving it forward causing the brake band engaging one end of the screw 38 to engage the reaction drum. Air valve button 88 is then depressed and the motor 48 reverses to back off the adjusting screw a predetermined number of turns. This occurs because the sprag or one way device 64 locks the control reel to the shaft 50 when shaft 50 rotates in a reverse direction, and the control reel winds the cable 80 from the recoil reel 74 while the recoil spring 78 winds up. When the cable is completely unwound from the recoil reel on the control reel, it stops further rotation of the control reel, the drive shaft 50 and the screwdriver bit 60. The recoil spring is wound up at this time. By selecting the length of the cable the number of revolutions the bit turns in the reverse direction is thereby controlled and, accordingly, the adjusting screw may be backed off any selected number of turns to set the distance between the brake band and the reaction drum. The cable stalls the air motor which holds the adjusting screw in adjusted position. While holding air valve button 88 down, the air valve 92 is depressed to run the motor 40 counterclockwise. This drives the socket drive tube clockwise to tighten the lock nut 36 to a set torque as the motor stalls. At this time the brake band adjustment is completed. Air valve buttons 88 and 92 are then released and the tool is removed from the adjusting screw and lock nut. The recoil spring then unwinds to rewind the cable onto the recoil reel to prepare the tool for the next brake band adjustment.

I claim:

1. A tool having an input and an output selectively rotatable by said input in either direction about an axis of rotation, power transmitting means operatively connecting said input to said output, rotation limiting means for limiting the number of revolutions of said power transmitting means and said output in one direction of rotation, said rotation limiting means including a drum mounted on said power transmitting means and a flexible member of predetermined length having one end operatively coupled to said drum and the other end grounded, one-way clutch means disposed between said drum and said power transmitting means for drivingly connecting said power transmitting means and said drum member when said power transmitting means is driven in said one direction so that said drum means can wind said flexible means thereon to thereby stop further rotation of said power transmitting means and said output after a limited number of turns in said one direction, and said clutch means being operative to disconnect said drum member and said power transmitting means when said power transmitting means is driven in an opposite direction to permit said output to be freely rotated by said input in said opposite direction.

2. In a tool having reversible input and output means, power transmitting means for operatively connecting said input and output means, rotation limiting means operatively connected to said output automatically responsive to rotation of said output in one direction to limit the number of turns said output means can rotate in said one direction and automatically responsive to rotation of said output in an opposite direction to permit unrestrained rotation thereof, and return means for automatically returning said rotation limiting means to a starting position subsequent to the limited rotation of said output means in said one direction.

3. In a tool having reversible input and output means, power transmitting means for operatively connecting said input and output means, limiting means operatively connected to said output automatically responsive to rotation of said output in one direction to limit the number of turns said output means can rotate in said one direction and automatically responsive to rotation of said output in an opposite direction to permit unrestrained rotation thereof, and means for automatically returning said limiting means to a starting position subsequent to the limited rotation of said output means in said one direction, said means for limiting the number of turns said output makes in said one direction including an elongated member of predetermined length operatively connected to said output means and to said automatic return means.

4. A tool having reversible input and output members for adjustably rotating a threaded member, first and second control means for effecting rotation of said input member in either direction, power transmitting means operatively connecting said input and said output member, brake means for limiting the rotation of said power transmitting means and said output member to a predetermined number of turns in one direction, and one-way clutch means operatively connected between said brake means and said power transmitting means for drivingly connecting said power transmitting means and said brake means in response to rotation of said power transmitting means in said one direction and for automatically disconnecting said brake means and said power transmitting means in response to rotation of said power transmitting means and said output member in an opposite direction.

5. A power tool having a housing, a plurality of inputs, a plurality of outputs, power transmitting means operatively coupling each one of said inputs to a corresponding one of said outputs to permit said inputs to rotate said outputs in either direction, a reel mounted on one of said power transmitting means, one-way friction means disposed between said reel and the corresponding power transmitting means operative to connect said reel and said power transmitting means when rotating in one direction, a second reel mounted for rotation in said housing, line means having one end portion connected to said first reel and a second end portion connected to said second reel for limiting rotation of said second output when said line unwinds from said second reel onto said first reel.

6. The power tool defined in claim 5 and further including spring means operatively connected to said second reel for winding said line thereon in response to termination of power transmittal from said second input to said second output.

7. An adjusting tool including a housing, an input mounted on said housing for selected forward and reverse rotation, an output, power transmitting means operatively coupling said input to said output to permit said input to selectively drive said output in either direction about an axis of rotation, a reel, one-way friction means mounting said reel on said power transmitting means responsive to rotation of said power transmitting means in one direction to lock said reel to said power transmitting means and responsive to rotation of said power transmitting means in an opposite direction to unlock said reel and said power transmitting means, a second reel mounted in said housing, a line connecting said reels to each other and wound on at least one of said reels, said line being unwound from one reel to the other reel to limit rotation of said output in one direction, and means for automatically winding said line from said first reel to said second reel to condition said output for subsequent limited rotation in said one direction.

8. An adjusting tool for a device having a threaded actuating screw and lock nut threaded thereon, a housing, first and second outputs for respectively engaging the screw and nut, first and second pneumatic motors mounted on said housing, control means for effecting selective rotation of said motors in either direction, first and second power transmitting means respectively connecting said first motor to said first output and said second motor to said second output, a control reel, a one-way locking device mounting said reel on said second power transmitting means, a recoil reel rotatably mounted in said housing, cable means connecting said reels to each other, said cable means being operative in response to rotation of said control reel by said power transmitting means in one direction to unwind from said recoil reel and wind on said control reel and subsequently limit further rotation of said control reel and said second output in one direction, spring means for turning said recoil reel in an opposite direction to unwind said cable means from said control reel onto said recoil reel in response to termination of transmittal of torque from said second motor to said second output and disengagement of said second output from the lock nut.

9. In an adjusting tool for a device having an adjustment screw threaded in a support and a lock nut threaded on the screw, comprising a housing, first and second reversible pneumatic motors, first and second power transmitting means for respectively connecting the outputs of the first motor to a first output and the output of a second motor to said second output, said outputs being coaxial for simultaneous engagement with the adjusting screw and lock nut, a control reel and a recoil reel, one-way friction means mounting said control reel on said second power transmitting means, means rotatably mounting said recoil reel in said housing, cable means secured to and extending from said recoil reel into connecting engagement with said control reel for limiting rotation of said second output when said control reel is turned a predetermined number of turns by said second motor means in one direction, first control means for effecting rotation of said output in a first direction to turn the nut on the screw, second control means for effecting rotation of said second output in a second direction and advance the screw in the support, third control means for effecting rotation of said output in said first direction to a predetermined number of turns controlled by the length of said cable means to retract the screw a predetermined number of turns, and fourth control means for effecting rotation of said first output in said second direction to turn the lock nut into engagement with said support.

10. The power tool device in claim 9 wherein said controls including manually operable air valves mounted on said housing movable between manually closed positions to open positions in response to selective operation thereof by a tool operator.

References Cited

UNITED STATES PATENTS

| 1,903,514 | 4/1933 | Merriman et al. | 81—57 |
| 2,736,220 | 2/1956 | Kamuk | 81—55 |
| 2,790,343 | 4/1957 | White | 81—55 |
| 2,814,221 | 11/1957 | Preslan | 81—56 X |
| 3,333,477 | 8/1967 | Denkowski | 192—139 X |

ERNEST R. PURSER, *Primary Examiner.*

U.S. Cl. X.R.

81—56; 173—19; 192—139